(12) United States Patent
Huard et al.

(10) Patent No.: US 8,281,589 B2
(45) Date of Patent: Oct. 9, 2012

(54) DEVICE AND METHOD FOR OPERATING AN INTERNAL COMBUSTION ENGINE, COMPUTER PROGRAM, COMPUTER PROGRAM PRODUCT

(75) Inventors: Guillaume Huard, Hemmingen (DE); Juergen Stegmaier, Leonberg (DE); Henrick Brandes, Ludwigsburg (DE); Martin Cichon, Stuttgart (DE); Manfred Schmitt, Heppenheim (DE); Lutz Rauchfuss, Vaihingen (DE); Oliver Tschismar, Weil Im Schoenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 677 days.

(21) Appl. No.: 12/437,032

(22) Filed: May 7, 2009

(65) Prior Publication Data

US 2010/0058759 A1 Mar. 11, 2010

(30) Foreign Application Priority Data

Sep. 8, 2008 (DE) .......................... 10 2008 041 874

(51) Int. Cl.
| | |
|---|---|
| F01K 23/10 | (2006.01) |
| F02G 3/00 | (2006.01) |
| B60K 6/20 | (2007.10) |
| F01N 3/02 | (2006.01) |
| F01N 5/02 | (2006.01) |
| F02M 25/07 | (2006.01) |

(52) U.S. Cl. ................ 60/618; 60/616; 60/597; 60/320; 123/568.12

(58) Field of Classification Search .................... 60/618, 60/616, 597, 645, 670, 320–323, 295, 286; 123/320, 321, 568.12, 41.15, 41.31, 406.45
See application file for complete search history.

(56) References Cited

U.S. PATENT DOCUMENTS

| | | | | | |
|---|---|---|---|---|---|
| 1,665,885 | A | * | 4/1928 | Le Mesurier | ............... 123/41.15 |
| 2,919,540 | A | * | 1/1960 | Percival | .......................... 60/618 |
| 3,303,646 | A | * | 2/1967 | Southam | ......................... 60/655 |
| 4,271,664 | A | * | 6/1981 | Earnest | ...................... 60/39.181 |
| 4,754,606 | A | * | 7/1988 | Nam | .............................. 60/616 |
| 4,996,845 | A | * | 3/1991 | Kim | ............................... 60/618 |
| 5,074,110 | A | * | 12/1991 | Singh | ........................... 60/39.63 |
| 5,121,607 | A | * | 6/1992 | George, Jr. | ...................... 60/618 |
| 5,133,298 | A | * | 7/1992 | Ahnger | ............................ 60/618 |
| 5,609,029 | A | * | 3/1997 | Ahnger et al. | ................. 60/618 |
| 5,799,632 | A | * | 9/1998 | Bennett | ........................... 60/320 |
| 6,151,891 | A | * | 11/2000 | Bennett | ........................... 60/320 |
| 6,155,042 | A | * | 12/2000 | Perset et al. | ............. 123/568.12 |
| 6,708,485 | B2 | * | 3/2004 | Hinder et al. | ................... 60/320 |

(Continued)

FOREIGN PATENT DOCUMENTS

CN 101865447 A * 10/2010

(Continued)

*Primary Examiner* — Thai Ba Trieu
(74) *Attorney, Agent, or Firm* — Michael J. Striker

(57) ABSTRACT

For operating an internal combustion engine having a throttle situated in an exhaust line or exhaust return line, in which a heat engine is driven by a quantity of heat produced by the internal combustion engine, in a first non-heating operating mode of the internal combustion engine, a first setpoint value is preset, a first operating parameter that characterizes a temperature of the internal combustion engine is detected, a first triggering value is determined for the triggering of the at least one throttle as a function of the first setpoint value and the first operating parameter, the at least one throttle is triggered in accordance with the first triggering value, and the at least one heat engine is driven by the resulting quantity of heat.

16 Claims, 4 Drawing Sheets

U.S. PATENT DOCUMENTS

| | | |
|---|---|---|
| 6,910,333 B2 | 6/2005 | Minemi et al. .................. 60/618 |
| 6,922,997 B1 * | 8/2005 | Larson et al. ................... 60/616 |
| 7,007,473 B2 * | 3/2006 | Nagatani et al. ................ 60/616 |
| 7,520,133 B2 * | 4/2009 | Hoetger et al. ................. 60/618 |
| 7,721,543 B2 * | 5/2010 | Massey et al. .................. 60/618 |
| 7,797,938 B2 * | 9/2010 | Ruiz ................................ 60/614 |
| 7,950,214 B2 * | 5/2011 | Bronicki et al. ........... 60/39.181 |
| 7,997,080 B2 * | 8/2011 | Harmon et al. ................ 60/670 |
| 2005/0044845 A1 * | 3/2005 | Onodera et al. ................ 60/286 |
| 2005/0229595 A1 | 10/2005 | Hoetger et al. ................. 60/618 |
| 2006/0201153 A1 * | 9/2006 | Kurotani et al. ............... 60/616 |
| 2006/0260567 A1 * | 11/2006 | Roithinger ................. 123/41.31 |
| 2008/0104958 A1 * | 5/2008 | Finkenrath et al. ......... 60/605.2 |
| 2009/0007547 A1 * | 1/2009 | Onodera et al. ................ 60/295 |
| 2010/0180584 A1 * | 7/2010 | Berger et al. ................... 60/320 |
| 2010/0300100 A1 * | 12/2010 | Harmon et al. ................. 60/645 |
| 2011/0131962 A1 * | 6/2011 | Toi et al. ......................... 60/320 |
| 2011/0197853 A1 * | 8/2011 | Takeishi et al. .......... 123/406.45 |
| 2011/0209473 A1 * | 9/2011 | Fritz et al. ....................... 60/618 |
| 2011/0308253 A1 * | 12/2011 | Ritter .............................. 60/661 |

FOREIGN PATENT DOCUMENTS

| | | |
|---|---|---|
| CN | 201991595 U * | 9/2011 |
| DE | 41 41 051 | 6/1993 |
| DE | 10 2006 057 247 | 6/2008 |
| EP | 1 333 157 | 8/2003 |
| EP | 1 573 194 | 9/2005 |
| JP | 60006014 A * | 1/1985 |

* cited by examiner

DEVICE AND METHOD FOR OPERATING AN INTERNAL COMBUSTION ENGINE, COMPUTER PROGRAM, COMPUTER PROGRAM PRODUCT

CROSS-REFERENCE TO RELATED APPLICATION

The invention described and claimed hereinbelow is also described in German Patent Application DE 10 2008 041 874.9 filed on Sep. 8, 2008. This German Patent Application, whose subject matter is incorporated here by reference, provides the basis for a claim of priority of invention under 35 U.S.C. 119(a)-(d).

BACKGROUND OF THE INVENTION

The present invention relates to a device and a method for operating an internal combustion engine.

The invention also relates to a computer program and a computer program product associated with the device and method for operating an internal combustion engine.

DE 41 41 051, EP 1 573 194, EP 1 333 157, and DE 10 2006 057 247 have already disclosed a device and method for operating an internal combustion engine in which a heat engine is coupled to the internal combustion engine. In them, at least one heat exchanger is integrated at least into an exhaust line of the internal combustion engine. The heat exchanger is integrated into a working cycle of the heat engine as an evaporator or superheater. The heat engine functions in accordance with the Rankine cycle.

In the Rankine cycle, a pump first feeds a fluid through the heat exchanger, which is situated for example in the exhaust line of the internal combustion engine, causing the fluid to be evaporated and superheated. A vapor produced in this way is then conveyed into a decompression apparatus in which the vapor drives an expansion machine. Then the remaining vapor is condensed in a subsequent condenser. Finally, the fluid travels through the same Rankine cycle again. The turbo element is coupled, for example, directly to the internal combustion engine, thus increasing the output of the internal combustion engine. Alternatively or in addition, the expansion machine drives one or more auxiliary units, in particular a generator, thus improving the exploitation of the fuel.

The above-mentioned devices and methods are based on the fact that the combustion of a fuel/air mixture in the internal combustion engine produces a hot exhaust that supplies a sufficient quantity of heat to operate the heat engine. If the internal combustion engine is being operated in an operating state such as overrunning or braking mode, in which no hot exhaust is being produced by the combustion, then the quantity of heat that is absorbed by the heat exchanger is insufficient to keep the Rankine cycle going. In addition, if a long absence of a sufficient heat quantity occurs, then the cooling of the heat-absorbing heat exchanger also increases the amount of time that is required to restart the Rankine cycle.

SUMMARY OF THE INVENTION

The device according to the invention, the method according to the invention, the computer program according to the invention, and the computer program product according to the invention, have the advantage over the prior art that in an internal combustion engine with a throttle situated in an exhaust line or exhaust return line, a heat engine is driven by a quantity of heat produced by the internal combustion engine; in a first non-heating operating mode of the internal combustion engine, a first setpoint value is predetermined; a first operating core value that characterizes the temperature of the internal combustion engine is determined; a first triggering value for the triggering of the throttle is determined as a function of the first setpoint value and the first operating core value; the throttle is triggered in accordance with the first triggering value; and the heat engine is driven by means of the quantity of heat thus produced.

This means that in a non-heating operating mode of the internal combustion engine, for example a braking or overrunning mode, the closing of the throttle causes mechanical energy to be converted into thermal energy. This thermal energy can then be used to protect against a cooling down or can even be used to operate the heat engine. The throttle in this case is regulated, for example, as a function of temperature and/or braking force demand.

The Rankine cycle is thus kept going, even when the internal combustion engine is being operated in an operating state such as an overrunning mode in which no hot exhaust is produced through the combustion of a fuel/air mixture in the internal combustion engine. In other words, a heat engine that functions in accordance with the Rankine cycle can therefore be operated even in the overrunning mode or during braking maneuvers. It is thus possible, for example through the use of engine braking when a commercial vehicle is traveling downhill, to continue operating auxiliary units that are driven by the heat engine. This also avoids the delay until the restarting of the Rankine cycle known from the prior art, which is caused by the cooling down of the components of the heat engine when a temporary shutdown of the Rankine cycle occurs. As a result, a turbocharger, for example, that is mounted in the engine and driven by the heat engine is available without delay.

It is particularly advantageous if a second operating core value that characterizes a crankshaft angle of the internal combustion engine is determined; a second triggering value, which is for the triggering of a first gas exchange valve situated in the internal combustion engine, is determined as a function of the second operating core value, and the first gas exchange valve is triggered in accordance with the second triggering value. This means that the thermal energy produced in the non-heating operation of the internal combustion engine is enhanced through a suitable triggering, for example, of a gas exchange valve such as an outlet valve of the internal combustion engine. In a work cycle of a cylinder, the outlet valve here is opened partway or all the way, for example, during a compression stroke, shortly before the cylinder reaches the top dead center. The compression of the gas in the cylinder generates a high temperature. As it exits the cylinder via the throttle, the hot gas is heated further in the exhaust line, thus heating the heat exchanger. As a result, additional thermal energy is extracted.

It is particularly advantageous if the second operating core value is determined; a third triggering value, which is for the triggering of a second gas exchange valve situated in the internal combustion engine, is determined as a function of the second operating core value; and the second gas exchange valve is triggered in accordance with of the third triggering value. This means that thermal energy produced in the non-heating operation of the internal combustion engine such as in the braking or overrunning mode is further improved through a suitable triggering, for example, of an inlet valve in addition to the triggering of the outlet valve. To accomplish this, the inlet valve is opened in order to aspirate air during the working stroke, for example. As a result, the valve triggering that is standard in a four-stroke engine is changed so that air is aspirated during two of the four strokes (1 and 3), is compressed in two of the four strokes (2 and 4), and is conveyed out in order to heat the heat exchanger.

It is particularly advantageous if in the first operating mode, a second setpoint value for a valve travel, a valve travel sequence, an opening point, a closing point, and/or an opening duration of the first gas exchange valve and/or second gas exchange valve is predetermined. This means that the first triggering value and/or second triggering value for triggering the first gas exchange valve and second gas exchange valve are matched to each other, for example in order to optimize the energy conversion from mechanical energy into thermal energy. For example, the thermal energy produced is greater if the valve travel of the outlet valve as it slides outward is small enough to produce an additional throttling action. For example, the inlet valve is completely opened during the working stroke in order to aspirate as much new air as possible.

It is particularly advantageous if in the first operating mode, the first setpoint value for the valve travel of the first gas exchange valve and/or second gas exchange valve is 5% to 40%, preferably 7.5% to 30% of the maximum valve travel of the first gas exchange valve and/or second gas exchange valve. This means that a particularly good energy conversion is possible, for example, when the outlet valve is not completely open.

It is particularly advantageous if the first setpoint value (S) indicates the gas temperature at the inlet to the heat exchanger.

It is particularly advantageous if the first setpoint value is selected to be greater than 200° C., preferably greater than 300° C. In order to keep the Rankine cycle going, it is therefore particularly advantageous to maintain temperatures of greater than 200° C., preferably greater than 300° C. during operation of the internal combustion engine in the non-heating operating state.

It is particularly advantageous if a part or all of the ejected gas is conveyed back to the intake side in order to thus increase the temperature level. To that end, a mass flow ratio of greater than one, in particular greater than 1.7, is established between a first exhaust mass, which is conveyed out of a combustion chamber situated in the internal combustion engine through an exhaust pipe, and a second exhaust mass, which is conveyed from the exhaust pipe back to the combustion chamber through an exhaust return line.

Exemplary embodiments of the invention are shown in the drawings and will be explained in greater detail in the description that follows.

DESCRIPTION OF THE PREFERRED EMBODIMENTS

Figure 1:
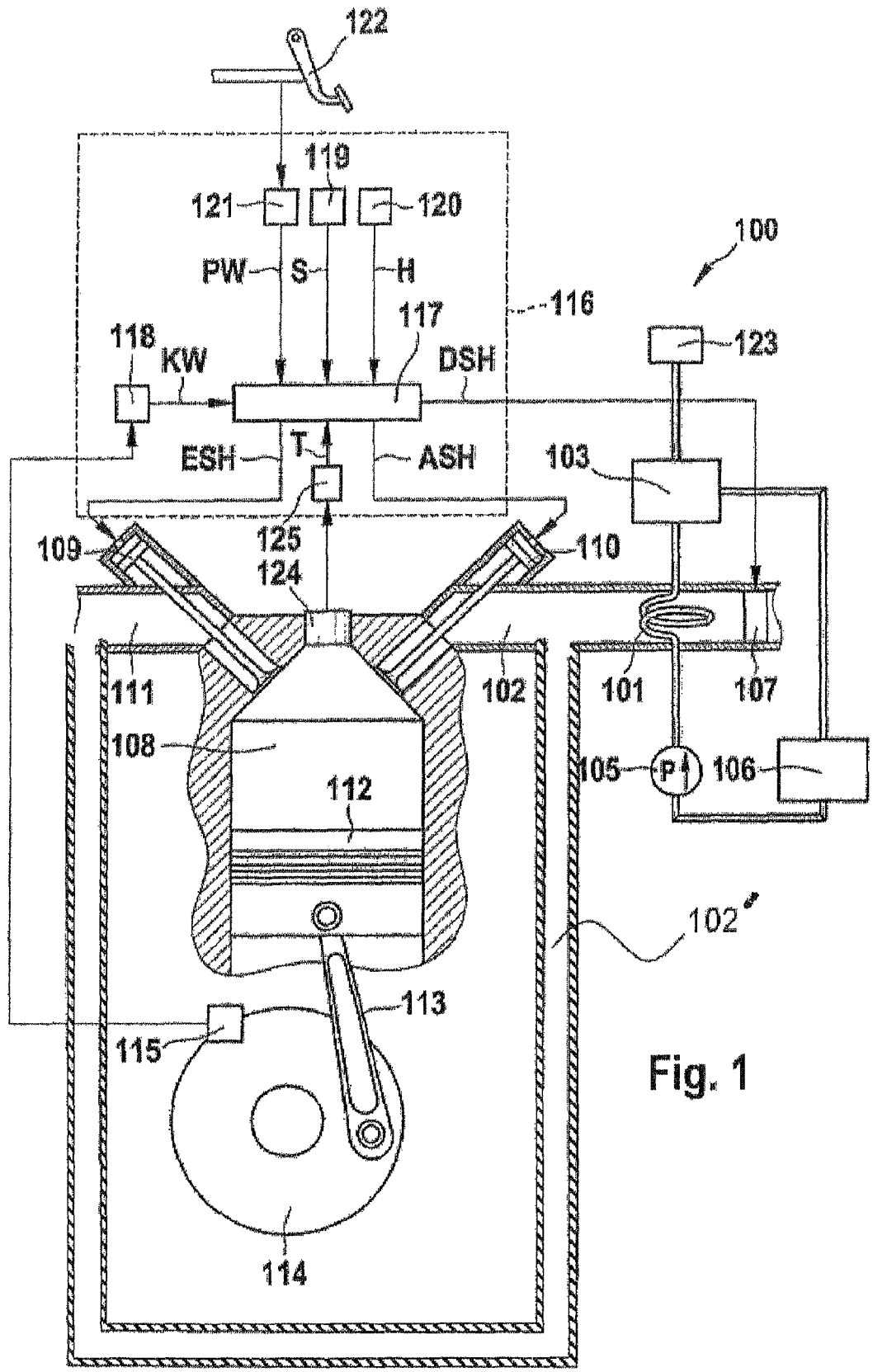
FIG. 1 schematically depicts the structure of an internal combustion engine.

FIG. 1 schematically depicts an internal combustion engine 100, for example a spark-ignition or diesel engine, having at least one combustion chamber 108. The internal combustion engine 100 can have more than one combustion chamber 108 and is used, for example, to drive a commercial vehicle. To that end, fresh air is aspirated into the combustion chamber 108 through an intake tube 111 via an inlet valve 109. An injection valve that is not shown in FIG. 1 injects fuel either into the intake tube 111 or directly into the combustion chamber 108. A fuel/air mixture produced in this way is ignited, for example in the case of a spark-ignition engine, by means of a spark plug that is not shown in FIG. 1. The thermal energy produced through the combustion of the fuel/air mixture in the combustion chamber 108 is converted into mechanical energy by means of a piston 112 situated in the combustion chamber and is transmitted to a crankshaft 114 by means of a connecting rod 113. A rotation of the crankshaft 114 produced in this way is detected in a known fashion by means of a crankshaft angle sensor 115.

A hot exhaust produced through the combustion of the fuel/air mixture in the combustion chamber 108 is conveyed out into an exhaust pipe 102 via an outlet valve 110. In the process of this, the hot exhaust flows through a heat exchanger 101 and a throttle 107. Part of the hot exhaust gas is returned to intake tube 111 of the internal combustion engine via exhaust return line 102'. Exhaust return line 102' extends from an opening in line 102 proximate outlet valve 110 to intake tube 111, providing a channel or line for gaseous communication therebetween.

The heat exchanger 101 is part of a heating process, which, in addition to a heat exchanger 101, includes a work-generating expansion machine 103, a condenser 106, and a pump 105.

The pump 105 pumps a fluid through the heat exchanger 101. The fluid evaporates in it and expands in a work-generating fashion in the expansion machine 103. Consequently, the energy absorbed by the heat exchanger 101 is converted into mechanical energy or indirectly into electrical energy in the expansion machine 103. The outgoing vapor is condensed in the condenser 106 situated downstream of the expansion machine 103. Then the pump 105 conveys the fluid out of the condenser 106 back into the heat exchanger 101, thus closing the circuit.

If the expansion machine 103 indirectly produces an electrical energy, then this electrical energy is supplied, for example, to an energy storage device 123 such as a battery. Alternatively, a mechanical energy produced by the expansion machine or an electrical energy produced indirectly by it can also be output directly to an electrical device such as an air-conditioning system or a turbocharger.

Alternative to the placement of the throttle 107 downstream of the heat exchanger 101 as shown in FIG. 1, it is also possible to place the throttle 107 in the exhaust pipe 102 upstream of the heat exchanger 101.

It is also possible to provide more than one heat exchanger 101 and/or more than one throttle 107.

If the internal combustion engine 100 has a separate line functioning as an exhaust return, then the heat exchanger 101 and the throttle 107 can alternatively or additionally also be placed in the exhaust return line.

For example, the gas exchange valves shown, i.e. the inlet valve 109 and the outlet valve 110, are electrohydraulically adjustable valves whose opening points, closing points, opening duration, and/or opening travel can be set to any level, for example by means of a fully variable valve-gear assembly. Alternatively, it is also possible to use any other valve control mechanism such as a rocker arm control, which has at least one additional control mechanism in addition to the camshaft.

The internal combustion engine 100 also includes a temperature sensor 124 that detects a temperature of the internal combustion engine 100, for example. Alternatively, it is also possible to measure any other operating core value of the internal combustion engine 100 that characterizes the temperature of the internal combustion engine 100, for example the temperature of a catalytic converter. It is also possible to carry out a model-based calculation of the temperature of the internal combustion engine 100 using other operating parameters.

In the example in FIG. 1, the temperature signal of the sensor 124 is detected by a first detection unit 125 in a control unit 116. The first detection unit 125 uses this signal in a known way to determine a first operating core value T that characterizes the temperature of the internal combustion engine 100. In the example from FIG. 1, this operating core value is the temperature T of the internal combustion engine 100 itself.

A second detection unit 121 likewise situated in the control unit 116 detects a signal transmitted by a pedal-travel sensor 122 and from it, determines a pedal travel PW. The pedal travel PW here assumes values between 0 and 100%; if the value PW=0%, then this means that a pedal—which is situated, for example, in a commercial vehicle and is used by a driver to request a torque from the internal combustion engine 100—is not depressed. By contrast, PW=100% means that the pedal is fully depressed. Alternatively, it is possible to use any other value that characterizes the torque requested from the internal combustion engine 100, such as an output value of an automatic cruise control.

A third detection unit 118 detects the signal transmitted by the crankshaft angle 115 and uses it in a known way to determine a crankshaft angle KW.

A first presetting device 119 is situated in the control unit 116 and presets a first setpoint value S, for example a setpoint temperature of the internal combustion engine. For example, the first setpoint value S is selected in a temperature range greater than 200° C., preferably greater than or equal to 300° C. The selection of the first setpoint value S depends on the type of heat engine used. For example, the first setpoint value S is selected as a temperature at which the heat engine can be operated particularly well in accordance with the Rankine cycle.

The control unit 116 also includes a second presetting device 120 that presets a second setpoint value H. For example, the second setpoint value H is a setpoint valve travel for the first gas exchange valve, e.g. the outlet valve 110, or for the second gas exchange valve, e.g. the inlet valve 109. The setpoint travel here is approx. 5% to 40% of the maximum valve travel, preferably 7.5% to 30% of the maximum valve travel during normal operation. The precise value of the setpoint travel is determined in an application step.

A calculation unit 117 is provided in the control unit 116 and reads in the first setpoint value S, the second setpoint value H, the temperature T, the crankshaft angle KW, and the pedal travel PW and based on them, determines a first triggering signal DSH, a second triggering signal ASH, and a third triggering signal ESH. The first triggering signal DSH is used for triggering the throttle 107.

The second triggering signal ASH is used for triggering the first gas exchange valve, for example the outlet valve 110. The third triggering signal ESH is used for triggering the second gas exchange valve, for example the inlet valve 109. Alternatively, it is also possible to use only proportionate input and output values.

Figure 2:
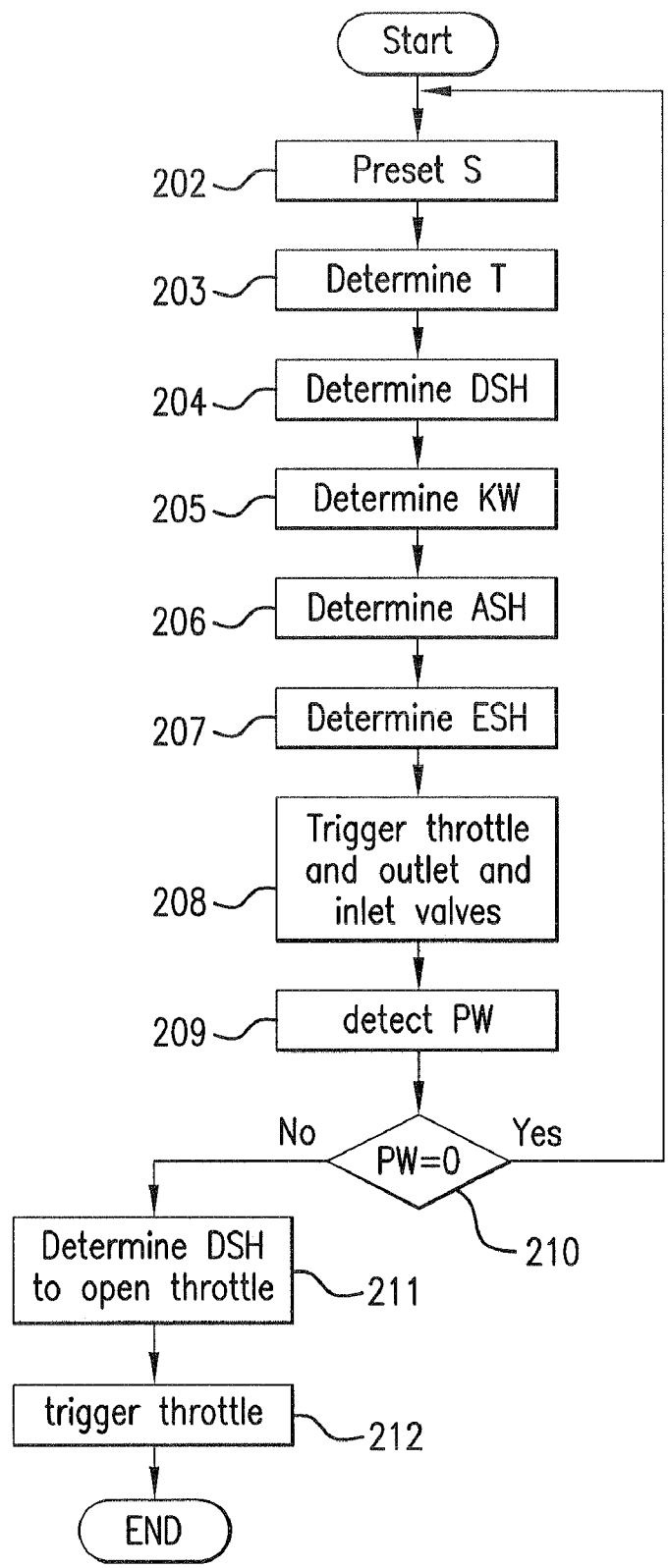
FIG. 2 is a flowchart of an exemplary embodiment of the method according to the invention, FIG. 3 schematically depicts a first possibility for the triggering of gas exchange valves, FIG. 4 schematically depicts a second possibility for the triggering of gas exchange valves, and FIG. 5 schematically depicts a computer program product.

For example, the triggering signals are calculated in accordance with a first embodiment of the method according to the invention, in accordance with the flowchart shown in FIG. 2.

The first embodiment of the method according to the invention is started whenever the internal combustion engine is operated in a first non-heating operating mode, i.e. an overrunning or braking mode, for example. After the start, the method is continued in step 202. In step 202, the first setpoint value S is preset; for example, the first setpoint value is preset to S=300° C. The method is then continued in step 203.

In step 203, the first operating core value, for example the temperature T of the internal combustion engine 100, is determined. The method is then continued in step 204.

In step 204, the first triggering value DSH is determined. For example, the first triggering value DSH is determined by means of a controller, for example a PID controller, which as input values, uses the first setpoint value S as a setpoint value and uses the first operating parameter, e.g. the temperature T, as the actual value. The method is then continued in step 205.

In step 205, the second operating parameter, for example the crankshaft angle KW, is determined. The method is then continued in step 206.

In step 206, the second triggering value ASH is determined, for example based on a characteristic curve as a function of the crankshaft angle KW. An example of such a characteristic curve is shown in FIG. 3.

Figure 3:
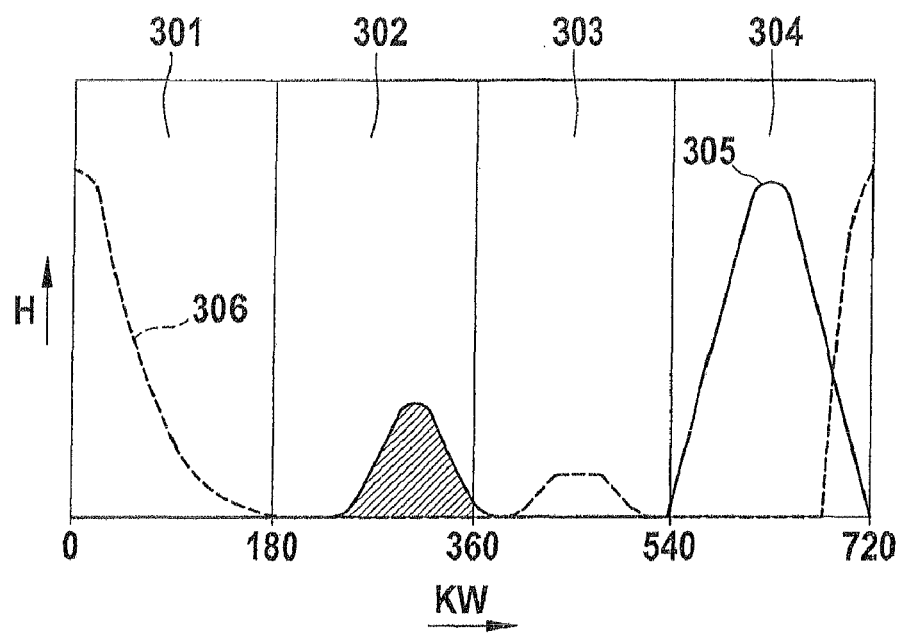

FIG. 3 describes a first triggering of the inlet valve 109 and the outlet valve 110; the travel of the gas exchange valves is plotted over the crankshaft angle KW. FIG. 3 depicts the regions intake 301, compression 302, work 303, exhaust 304 of a four-stroke engine. These regions each extend for 180° of crankshaft angle and succeed one another in the above-mentioned sequence starting at zero degrees of crankshaft angle. The method according to the invention is not limited to use in a four-stroke engine. The method according to the invention is also used in an analogous fashion in engines that operate on the basis of other stroke principles, for example a two-stroke engine. In that case, for example, the signal sequences of the intake and work strokes are combined and those of compression and exhaust are combined.

In FIG. 3, the triggering of the outlet valve 110 is depicted as a first characteristic curve 305. According to the first characteristic curve 305, the travel of the outlet valve 110 is equal to zero during the intake stroke 301 between 0 and 180° of crankshaft angle. The first characteristic curve 305 begins the compression stroke 302 equal to zero, then slowly rises to a maximum value, and then falls back to zero. In this case, the compression stroke 302 ends before the valve travel of the outlet valve 110 according to the first characteristic curve 305 reaches the value zero. The first characteristic curve 305 only reaches zero in the work stroke 303 following the compression stroke 302. The valve travel of the outlet valve 110 remains equal to zero until the end of the work stroke 303 at 540° of crankshaft angle. In the exhaust stroke 304, the first characteristic curve 305 rises steeply until it reaches a second maximum value. The first characteristic curve 305 then falls steeply until it reaches zero at the end of the exhaust stroke at 720° of crankshaft angle.

The second triggering value ASH is calculated in a known fashion based on the setpoint travel H that is predetermined by the first characteristic curve 305. The maximum setpoint travel H in the compression stroke 302 is for example 5% to 40% of the maximum valve travel, preferably 7.5% to 30% of the maximum valve travel. The maximum valve travel is reached, for example, in the exhaust stroke 304. The method is then continued in step 207.

In step 207, the third triggering value ESH is determined. For example, the third triggering value ESH is determined based on a second characteristic curve 306. The second characteristic curve 306 is depicted in FIG. 3.

The second characteristic curve 306 begins at a positive maximum at the crankshaft angle of 0° and falls to 0° at the crankshaft angle of 180°. The second characteristic curve 306 then remains equal to zero until the crankshaft angle exceeds 360°. The second characteristic curve 306 then rises slowly to an additional maximum value, after which it falls back to zero before the end of the work stroke 303. The second characteristic curve 306 then remains equal to zero until shortly before the end of the exhaust stroke 304. Shortly before the end of the exhaust stroke 304, the second characteristic curve 306 rises steeply to the same value as it has at the crankshaft angle of 0°.

The second characteristic curve 306 is used in a known fashion to determine the triggering value ESH for the inlet valve 109.

For the second triggering value ASH and third triggering value ESH, for example, an electrical signal is produced, which induces the travel sequences of the first gas exchange valve and second gas exchange valve described in FIG. 3.

The method is then continued in step 208.

In step 208, the throttle 107, the outlet valve 110, and the inlet valve 109 are triggered with the first triggering value DSH, the second triggering value ASH, and the third triggering value ESH. The method is then continued in step 209.

In step 209, the pedal travel PW is detected. The method is then continued in step 210.

In step 210, a check is run as to whether the pedal travel PW=0. If the pedal travel PW=0, then the method is continued in step 202. Otherwise, the sequence follows the branch to step 211.

In step 211, the first triggering value DSH is determined so that the throttle 107 is completely opened. The method is then continued in step 212.

In step 212, the throttle 107 is triggered with the first triggering signal DSH. Then the method comes to an end.

Figure 4:
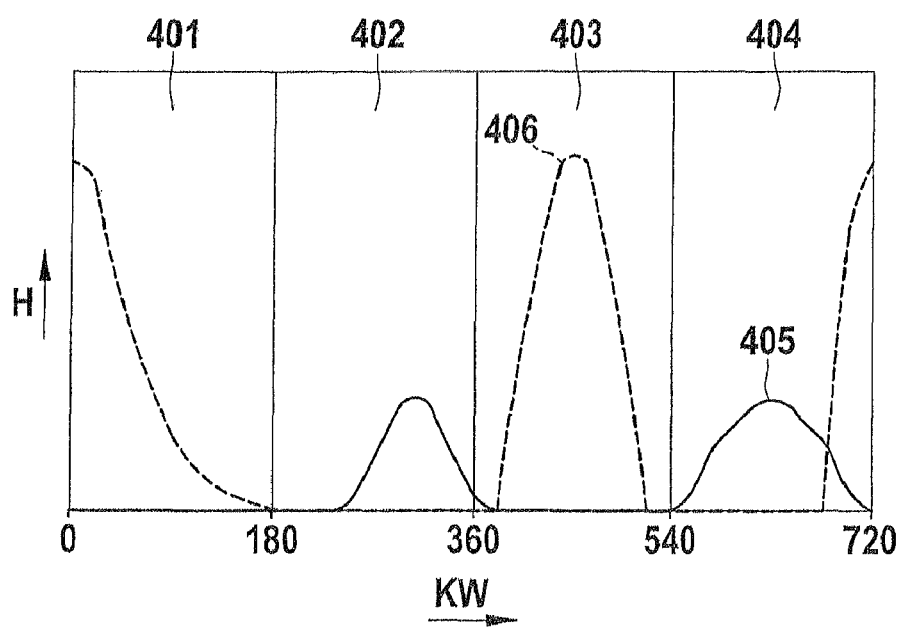

In a second embodiment, the second triggering value ASH and the first triggering value ESH are determined in accordance with the curve shown in FIG. 4. This causes a four-stroke internal combustion engine to behave in a fashion similar to that of a two-stroke internal combustion engine. In this case, the intake air is first compressed and then pushed out, hence producing a more powerful thermal energy. As the path of the third characteristic curve 405 in FIG. 4 demonstrates, the outlet valve 110 is not completely opened in the exhaust stroke 404, for example. The remaining path of the third characteristic curve 405 corresponds to that of the characteristic curve 305.

The path of the fourth characteristic curve 406 differs from the path of the second characteristic curve 306 in that the inlet valve is completely opened in the work stroke 403. As a result, additional air is aspirated, which can be subsequently used for compression to produce thermal.

Alternatively to triggering the gas exchange valves in accordance with the signal curves from FIGS. 3 and 4, the gas exchange valves can be triggered in any other way in which air is aspirated during at least one stroke and pushed out during at least one stroke.

If an exhaust return line is provided in the internal combustion engine, then the method according to the invention is used in an analogous fashion. In addition, a mass flow ratio is established between a first exhaust mass that is pushed out of the combustion chamber 108 and a second exhaust mass that is conveyed back to the combustion chamber 108 through the exhaust return line. The second exhaust mass is then adjusted, for example through regulation of the inlet and outlet valves, so that the mass flow ratio is greater than one, in particular greater than 1.7. This further increases the temperature level of the exhaust.

It will be understood that each of the elements described above, or two or more together, may also find a useful application in other types of constructions and methods differing from the types described above.

Figure 5:
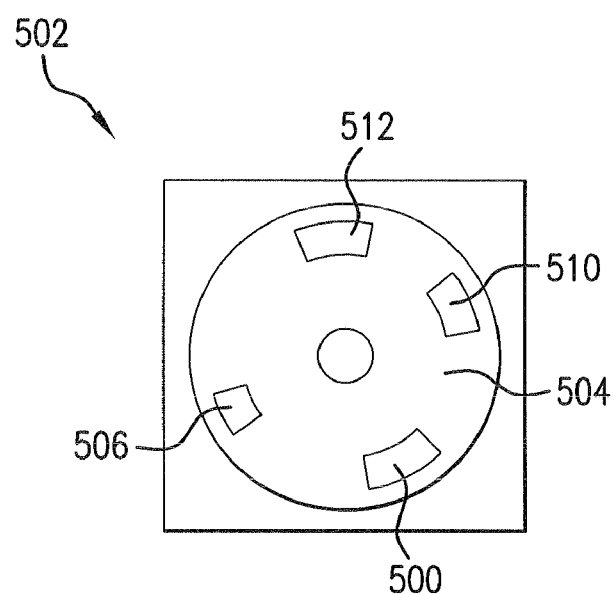

While this invention is discussed as both the hardware of FIG. 1, including control unit 116 and the method of Fi 2 it can be understood by a person of ordinary skill in the art that the apparatus discussed above in connection with FIG. 1 may be programmed or otherwise designed to carry out the practice of the method of this invention. Also, a computer program product, such as a pre-recorded floppy disk 502 in FIG. 5 or other similar computer program product, for use with a computer system or control unit for controlling an internal combustion engine as set forth above, could include a storage medium, such as magnetic storage medium 504 and thereon, such as program means 506, 500, 510 and 512, for directing the control unit 116 of FIG. 1 to facilitate the practice of the method of this invention. It will be understood that such apparatus and computer program products also fall within the spirit and scope of this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for operating an internal combustion engine with at least one throttle in an exhaust line or exhaust return line, the method comprising the steps of
    driving at least one heat engine situated in the internal combustion engine by a quantity of heat produced by the internal combustion engine; and
    in a first non-heating operating mode of the internal combustion engine presetting a first setpoint value,
    detecting a first operating parameter that characterizes a temperature or heat quantity of the internal combustion engine,
    determining a first triggering value for triggering of the at least one throttle as a function of the first setpoint value and the first operating parameter,
    triggering the at least one throttle in accordance with the first triggering value, and
    driving the at least one heat engine by a resulting quantity of heat.

2. A method for operating an internal combustion engine as defined in claim 1, further comprising
    detecting a second operating parameter that characterizes a crankshaft angle of the internal combustion engine,
    determining a second triggering value for triggering of a first gas exchange valve situated in the internal combustion engine as a function of the second operating parameter, and
    triggering the first gas exchange valve in accordance with the second triggering value.

3. A method for operating an internal combustion engine as defined in claim 2, further comprising
    detecting a second operating parameter, determining a third triggering value for triggering of a second gas exchange valve situated in the internal combustion engine as a function of the second operating parameter, and
    triggering a second gas exchange valve in accordance with the third triggering value.

4. A method for operating an internal combustion engine as defined in claim 1, further comprising
    predetermining in the first non-heating operating mode a parameter selected from the group consisting of a second setpoint value for a valve travel, a valve travel sequence, an opening point, a closing point, an opening duration of a first gas exchange valve, and opening duration of a second gas exchange valve, and a combination thereof.

5. A method for operating an internal combustion engine as defined in claim 4, further comprising
in the first non-heating operating mode, selecting the first setpoint value for the valve travel of an exchange valve selected from the group consisting of the first gas exchange valve, the second gas exchange valve and both, as 5%-40% of a maximum valve travel of the gas exchange valve selected from the group consisting of the first gas exchange valve, the second gas exchange valve and both.

6. A method for operating an internal combustion engine as defined in claim 5, wherein said selecting includes selecting the first setpoint value as 7.5%-30% of the maximum valve travel.

7. A method for operating an internal combustion engine as defined in claim 1, further comprising using the first setpoint value to indicate a gas temperature at an inlet to the heat exchanger.

8. A method for operating an internal combustion engine as defined in claim 1, further comprising selecting the first setpoint value to be greater than 200° C.

9. A method for operating an internal combustion engine as defined in claim 8, wherein said selecting includes selecting the first setpoint value greater than 300° C.

10. A method for operating an internal combustion engine as defined in claim 1, further comprising
providing a mass flow ratio between a first exhaust mass is conveyed out of a combustion chamber situated upstream of the exhaust line or exhaust return line in the internal combustion engine and a second exhaust mass, which is conveyed back to the combustion chamber through the exhaust line or exhaust return line, wherein the mass flow ratio is greater than one.

11. A method for operating an internal combustion engine as defined in claim 10, wherein said providing includes selecting the mass flow ratio to be greater than 1.7.

12. A computer program comprising computer readable instructions that are stored on a non-transitory machine-readable medium, which computer program, when running on a computer device, causes the computer device to execute all of the steps of the method as recited in claim 1.

13. A computer program product having programming code comprising computer readable instructions that is stored on a non-transitory machine-readable medium, which program code when executed by a computer, causes the computer to carry out the method as recited in claim 1.

14. A computer program product as set forth in claim 13, wherein the computer comprises a control unit for an internal combustion engine.

15. A device for operating an internal combustion engine, comprising
at least one throttle situated in an exhaust line or exhaust return line;
at least one heat engine situated in the internal combustion engine and driven by a quantity of heat produced by the internal combustion engine; and
means for presetting a first setpoint value, means for detecting a first operating parameter that characterizes a temperature of the internal combustion engine, means for determining a first triggering value for triggering of the at least one throttle as a function of the first setpoint value and the first operating parameter, and means for triggering the at least one throttle in accordance with the first triggering value in a first non-heating operating mode of the internal combustion engine.

16. A device as defined in claim 15, wherein said means for presetting a first setpoint value include a first presetting device, said means for detecting a first operating parameter include a first detecting unit, said means for determining a first triggering value includes a calculation unit, and said means for triggering the at least one throttle being formed by said calculation unit.

* * * * *